(12) United States Patent
Hrusch et al.

(10) Patent No.: US 11,680,565 B2
(45) Date of Patent: Jun. 20, 2023

(54) MOTOR-PUMP SYSTEM

(71) Applicant: Schaeffler Technologies AG & Co. KG, Herzogenaurach (DE)

(72) Inventors: Nicholas Hrusch, Wooster, OH (US); Jeffrey Hemphill, Copley, OH (US); Joshua Hixenbaugh, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 192 days.

(21) Appl. No.: 17/169,615

(22) Filed: Feb. 8, 2021

(65) Prior Publication Data

US 2022/0252067 A1     Aug. 11, 2022

(51) Int. Cl.
| | |
|---|---|
| *F04C 14/28* | (2006.01) |
| *F04C 2/10* | (2006.01) |
| *H02K 11/22* | (2016.01) |
| *F04C 11/00* | (2006.01) |
| *H02K 11/225* | (2016.01) |
| *H02K 11/33* | (2016.01) |
| *H02K 3/50* | (2006.01) |

(52) U.S. Cl.
CPC .............. *F04C 14/28* (2013.01); *F04C 2/10* (2013.01); *H02K 3/50* (2013.01); *H02K 11/225* (2016.01); *H02K 11/33* (2016.01); *F04C 11/008* (2013.01); *F04C 2240/10* (2013.01); *F04C 2240/20* (2013.01); *F04C 2240/30* (2013.01); *F04C 2240/40* (2013.01); *F04C 2240/50* (2013.01); *F04C 2240/60* (2013.01); *F04C 2240/81* (2013.01); *H02K 2203/06* (2013.01); *H02K 2203/09* (2013.01); *H02K 2211/03* (2013.01)

(58) Field of Classification Search
CPC .......... F04C 14/28; F04C 2/10; F04C 11/008; F04C 11/00; H02K 11/225
USPC ........................................... 417/356; 418/171
See application file for complete search history.

(56) References Cited

U.S. PATENT DOCUMENTS

| | | | | |
|---|---|---|---|---|
| 5,219,276 | A * | 6/1993 | Metzner | F04C 15/008 417/423.7 |
| 8,038,423 | B2 * | 10/2011 | Nakayoshi | F04C 11/008 418/171 |
| 8,632,321 | B2 | 1/2014 | Hadar et al. | |
| 8,696,326 | B2 | 4/2014 | Hadar et al. | |
| 11,499,548 | B2 * | 11/2022 | Hinrichs | F04C 11/008 |

(Continued)

FOREIGN PATENT DOCUMENTS

| | | | |
|---|---|---|---|
| DE | 102012223892 A1 | 6/2014 | |
| WO | WO-2019233636 A1 * | 12/2019 | ............ F04C 11/008 |

OTHER PUBLICATIONS

English translation of WO2019233636 by PE2E translation Aug. 1, 2022.*

*Primary Examiner* — Deming Wan

(57) ABSTRACT

A motor-pump system includes a first housing part, a hydraulic pump, an electric motor, and a sensor board. The hydraulic pump includes an outer gerotor rotationally supported on the first housing part and an inner gerotor rotationally supported on the first housing part. The electric motor includes a stator assembly rotationally fixed in the first housing part and a rotor assembly with a non-ferrous sensor target, fixed to the outer gerotor. The sensor board includes a plurality of sensor traces for inductively sensing a signal from the non-ferrous sensor target when the outer gerotor is rotated.

17 Claims, 1 Drawing Sheet

(56) References Cited

U.S. PATENT DOCUMENTS

| | | |
|---|---|---|
| 2009/0142208 A1 | 6/2009 | Rhein et al. |
| 2015/0033938 A1 | 2/2015 | Erlston et al. |
| 2015/0084446 A1* | 3/2015 | Atar .................... H02K 11/215 |
| | | 310/43 |
| 2015/0132163 A1 | 5/2015 | Wright et al. |
| 2017/0167491 A1 | 6/2017 | Reul et al. |
| 2018/0238924 A1 | 8/2018 | Wang |
| 2020/0182241 A1 | 6/2020 | Pawellek et al. |

* cited by examiner

MOTOR-PUMP SYSTEM

TECHNICAL FIELD

The present disclosure relates generally to a motor-pump system, and more specifically to a pump and motor unit with integrated electronics.

BACKGROUND

Motor-pump systems are known. One example is shown and described in German Patent Application Publication No. DE 10 2012 223 892 A1 titled Rotationskolbenpumpe (Rotary piston pump) to Christian Langenbach.

SUMMARY

Example embodiments broadly comprises a motor-pump system including a first housing part, a hydraulic pump, an electric motor, and a sensor board. The hydraulic pump includes an outer gerotor rotationally supported on the first housing part and an inner gerotor rotationally supported on the first housing part. The electric motor includes a stator assembly rotationally fixed in the first housing part and a rotor assembly with a non-ferrous sensor target, fixed to the outer gerotor. The sensor board includes a plurality of sensor traces for inductively sensing a signal from the non-ferrous sensor target when the outer gerotor is rotated.

In some example embodiments, the motor-pump system includes a control board electrically connected to the stator assembly and the sensor board, and an annular bus bar electrically connected between the stator assembly and the control board. In some example embodiments, the motor-pump system includes plurality of motor leads soldered to the annular bus bar and a plurality of power wires soldered to the annular bus bar. The annular bus bar includes a plurality of traces electrically connecting each one of the plurality of motor leads to respective ones of the plurality of power wires. In an example embodiment, the plurality of power wires extend through respective holes in the sensor board and are sealed to the sensor board.

In some example embodiments, the motor-pump system includes a center plate, the sensor board is fixed to the first housing part and the center plate, and the center plate rotationally supports the outer gerotor and the inner gerotor. In an example embodiment, the sensor board is sealed to the first housing part and the center plate, the first housing part, the sensor board and the center plate form at least a portion of a first chamber, and the electric motor and the hydraulic pump are disposed in the first chamber. In an example embodiment, the motor-pump system includes a control board electrically connected to the stator assembly and the sensor board, and a first connector for transmitting the signal between the sensor board and the control board. A first portion of the first connector is fixed to the sensor board and a second portion of the first connector is fixed to the control board.

In some example embodiments, the motor-pump system includes a control board electrically connected to the stator assembly and the sensor board, and a second housing part. The second housing part is fixed to the first housing part, the second housing part and the sensor board form at least a portion of a second chamber, and the control board is disposed in the second chamber. In an example embodiment, the motor-pump system includes a second connector. The second connector is fixed to the control board and the second connector extends through the second housing part to transmit and receive power and control signals between the motor-pump system and an external component.

In some example embodiments, the motor-pump system includes a hydraulic manifold fixed to the first housing part, and the hydraulic manifold has an inlet port for providing a hydraulic fluid to the hydraulic pump, and an outlet port for expelling the hydraulic fluid from the hydraulic pump. In an example embodiment, the first housing part has an orifice hydraulically connected to the inlet port.

In some example embodiments, the motor-pump system includes a center shaft fixed to the inner gerotor and a first bearing. The inner gerotor is rotationally supported on the first housing part by the first bearing. In an example embodiment, the motor-pump system includes a center plate fixed to the sensor board and a second bearing. The inner gerotor is rotationally supported on the center plate by the second bearing.

In some example embodiments, the motor-pump system includes a control board electrically connected to the stator assembly and the sensor board, and the control board has a processor configured to receive the signal from the sensor board and receive a first three-phase current signal from the stator assembly. In an example embodiment, the processor is further configured to receive a pressure signal from a pressure sensor or a flow signal from a flow sensor. In an example embodiment, the processor is further configured to transmit a second three-phase current signal to the stator assembly.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
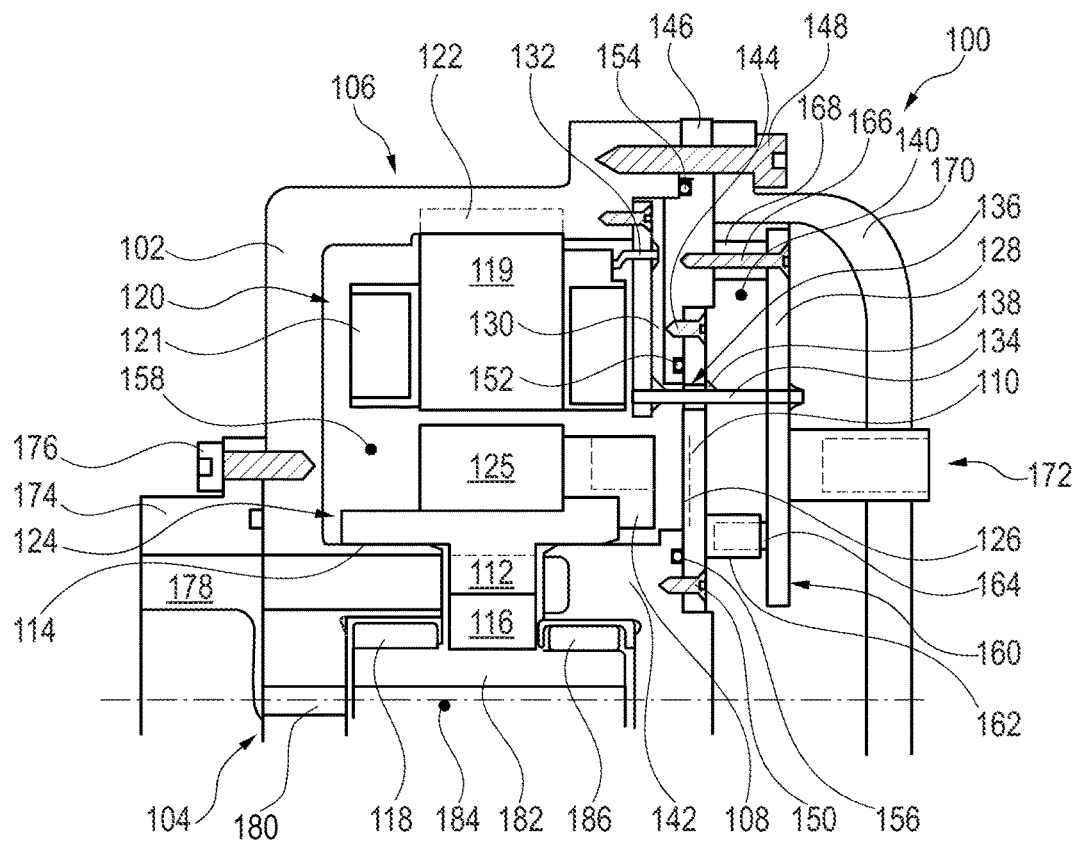
FIG. 1 illustrates a top-half cross-sectional view of a motor-pump system according to an example embodiment.

The following description is made with reference to FIG. 1. FIG. 1 illustrates a top-half cross-sectional view of motor-pump system 100 according to an example embodiment. Motor-pump system 100 includes housing part 102, hydraulic pump 104, electric motor 106, and sensor board 110. The hydraulic pump includes outer gerotor 112 rotationally supported on the housing part at bushing surface 114, and inner gerotor 116 rotationally supported on the housing part via bearing 118. Although a bushing surface and bearing are shown, other methods may be employed to support the gerotors on the housing part. For example, bushings or bearings may be used for both supports and/or lubricant holes (not shown) may be provided in the housing for cooling and/or reduced friction.

The electric motor includes stator assembly 120 with laminations 119 and windings 121, rotationally fixed in the housing part by tabs or lugs 122 installed in slots in the housing part, for example, and rotor assembly 124 with windings 125 and non-ferrous sensor target 108, fixed to the outer gerotor by a press-fit, for example. It should be noted that other methods such as splines, staking, adhesives, welding, etc. may be employed to secure the stator assembly to the housing part and/or the rotor assembly to the outer gerotor.

The sensor board includes sensor traces 126 for inductively sensing a signal from the non-ferrous sensor target when the outer gerotor is rotated. That is, teeth or other undulating features on the sensor target are detected as a variable electrical signal in the sensor traces as they move past. The motor-pump system also includes control board 128 electrically connected to the stator assembly and the sensor board as described in more detail below, and annular bus bar 130 electrically connected between the stator assembly and the control board. Motor leads 132 and power wires 134 are soldered to the annular bus bar. The bus bar includes traces (not shown) electrically connecting each one of the motor leads to a respective one of the power wires. The power wires extend through respective holes 136 in the sensor board and are sealed to the sensor board at solder joints 138, for example, to provide chamber 140 for electrical components as described below. It should be noted that, although the power wires are shown soldered to the sensor board, the power wires do not provide power to the sensor board, and other methods such as sealants, potting, or grommets may be used to seal the power wires to the sensor board.

Motor-pump system 100 also includes center plate 142. Sensor board 110 is fixed to the housing part with bolts 144, for example, installed in mounting plate 146, which is, in turn, fixed to the housing part by bolts 148, for example. Although bolts are shown and described throughout the specification, other fastening methods such as welding, brazing or adhesives, for example, may be used to join components. The sensor board is also fixed to the center plate by bolts 150, for example. Thus, the center plate is fixed to the housing part by sensor board 110 and mounting plate 146, providing a solid connection for the center plate to rotationally support the outer gerotor and the inner gerotor. Sensor board 110 is sealed to the mounting plate at seal 152, for example, and the mounting plate is sealed to the housing part by seal 154, effectively sealing the sensor board to the housing part. Similarly, the sensor board is sealed to the center plate by seal 156. The housing part, the sensor board and the center plate form a portion of chamber 158, and the electric motor and the hydraulic pump are disposed in the chamber.

Motor-pump system 100 includes connector 160 for transmitting the signal between the sensor board and the control board. Portion 162 of the connector is fixed to the sensor board and portion 164 of the connector is fixed to the control board. During installation, the sensor board is attached to the mounting plate and the control board is plugged in to the sensor board at the connector before mounting to the mounting plate with bolts 166 and standoffs 168. It should be noted that additional boards (e.g., a separate power electronics board, not shown) can be mounted to the control board or the mounting plate with additional bolts and standoffs in a similar manner.

Figure 2:
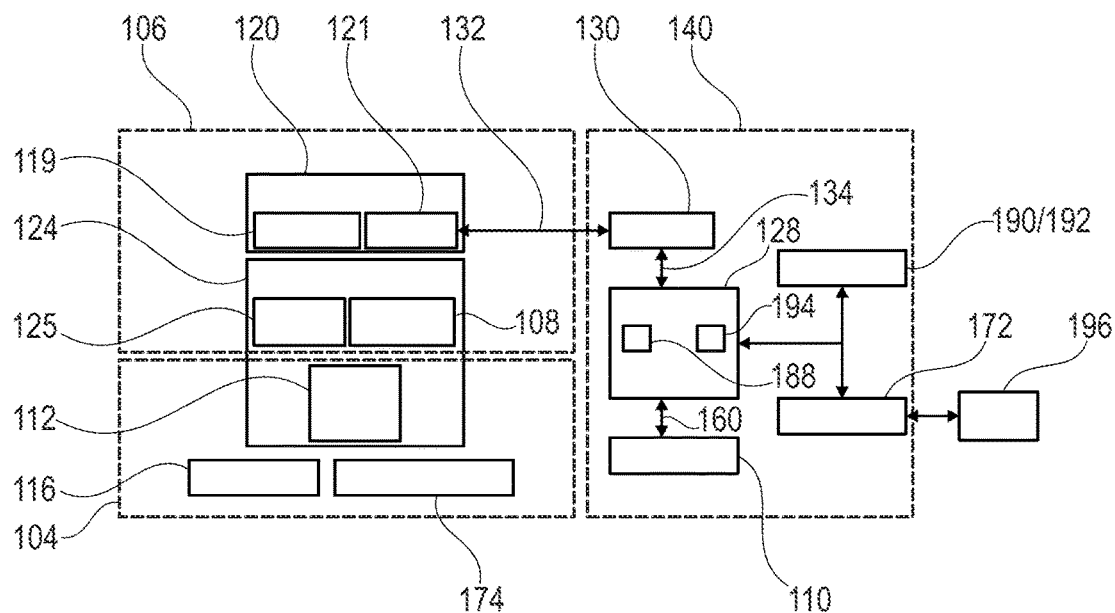
FIG. 2 illustrates a schematic view of the motor-pump system of FIG. 1.

The motor-pump system also includes housing part 170 fixed to housing part 102 that, together with the sensor board, forms a portion of chamber 140, and control board 128 is disposed in the chamber. The motor pump system includes connector 172 fixed to the control board and extending through housing part 170 to transmit and receive power and control signals between the motor-pump system and an external component. That is, while the motor-pump system may include internal motor control and sensor(s), external power and control signals from external controller 196 (ref. FIG. 2) may be communicated to the motor-pump system (and specifically, the control board) through connector 172.

The motor pump system also includes hydraulic manifold 174 fixed to housing part 102 by bolts 176, for example. The hydraulic manifold includes inlet port 178 for providing a hydraulic fluid to the hydraulic pump, and outlet port (not shown) for expelling the hydraulic fluid from the hydraulic pump. Housing part 102 includes orifice 180 hydraulically connected to the inlet port. Orifice 180 may be used for redirecting any leaked fluid from chamber 158 back into the hydraulic pump. The motor-pump system also includes center shaft 182 and bearing 118. Shaft bore 184 is hydraulically connected to orifice 180 to further expel fluid from the chamber. Center shaft 182 is fixed to the inner gerotor by a press-fit or other fixed connection, and the inner gerotor is rotationally supported on housing part 102 by the bearing. Motor-pump system 100 includes center plate 142 fixed to sensor board 110 by bolts 150, for example, and bearing 186. The inner gerotor is rotationally supported on the center plate by bearing 186.

The following description is made with reference to FIGS. 1-2. FIG. 2 illustrates a schematic view of the motor-pump system of FIG. 1. Control board 128 includes processor 188 configured to receive the signal from the sensor board and receive a first three-phase current signal from the stator assembly. The processor is further configured to receive a pressure signal from pressure sensor 190 or a flow signal from flow sensor 192. The processor is further configured to transmit a second three-phase current signal to the stator assembly. That is, the control board includes motor driver 194 that, when commanded by the processor, sends a three-phase signal to the stator assembly through the power wires and motor leads to rotate the stator assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

- 100 Motor-pump system
- 102 Housing part (first)
- 104 Hydraulic pump
- 106 Electric motor
- 108 Non-ferrous sensor target
- 110 Sensor board
- 112 Outer gerotor
- 114 Bushing surface
- 116 Inner gerotor
- 118 Bearing
- 119 Laminations (stator assembly)
- 120 Stator assembly
- 121 Windings (stator assembly)
- 122 Lugs
- 124 Rotor assembly
- 125 Laminations
- 126 Sensor traces
- 128 Control board
- 130 Annular bus bar
- 132 Motor leads
- 134 Power wires
- 136 Holes (sensor board)
- 138 Solder joints (sensor board)
- 140 Chamber (second)
- 142 Center plate
- 144 Bolts (sensor board to mounting plate)
- 146 Mounting plate
- 148 Bolts (mounting plate to housing part)
- 150 Bolts (sensor board to center plate)
- 152 Seal (sensor board to mounting plate)
- 154 Seal (mounting plate to housing part)
- 156 Seal (sensor board to center plate)
- 158 Chamber (first)
- 160 Connector (first)
- 162 Connector portion (first, sensor board)
- 164 Connector portion (second, control board)
- 166 Bolts (control board to mounting plate)
- 168 Standoffs
- 170 Housing part (second)
- 172 Connector (second)
- 174 Hydraulic manifold
- 176 Bolts (manifold to housing part)
- 178 Inlet port
- 180 Orifice (housing part)
- 182 Center shaft
- 184 Bore (center shaft)
- 186 Bearing (second)
- 188 Processor
- 190 Pressure sensor
- 192 Flow sensor
- 194 Motor driver
- 196 External controller

What is claimed is:

1. A motor-pump system, comprising:
   a first housing part;
   a hydraulic pump comprising:
      an outer gerotor rotationally supported on the first housing part; and
      an inner gerotor rotationally supported on the first housing part;
   an electric motor comprising:
      a stator assembly rotationally fixed in the first housing part; and
      a rotor assembly fixed to the outer gerotor;
   a sensor board comprising a plurality of sensor traces configured for inductively sensing a signal from the rotor assembly when the outer gerotor is rotated;
   a control board electrically connected to the stator assembly and the sensor board; and
   an annular bus bar electrically connected between the stator assembly and the control board.

2. The motor-pump system of claim 1 further comprising:
   a plurality of motor leads soldered to the annular bus bar; and
   a plurality of power wires soldered to the annular bus bar, wherein the annular bus bar comprises a plurality of traces electrically connecting each one of the plurality of motor leads to respective ones of the plurality of power wires.

3. The motor-pump system of claim 2 wherein the plurality of power wires extend through respective holes in the sensor board and are sealed to the sensor board.

4. The motor-pump system of claim 1 further comprising a center plate, wherein:
   the sensor board is fixed to the first housing part and the center plate; and
   the center plate rotationally supports the outer gerotor and the inner gerotor.

5. The motor-pump system of claim 4 wherein:
   the sensor board is sealed to the first housing part and the center plate;
   the first housing part, the sensor board and the center plate form at least a portion of a first chamber; and
   the electric motor and the hydraulic pump are disposed in the first chamber.

6. The motor-pump system of claim 1 further comprising:
   a first connector for transmitting the signal between the sensor board and the control board, wherein a first portion of the first connector is fixed to the sensor board and a second portion of the first connector is fixed to the control board.

7. The motor-pump system of claim 1 further comprising:
   a second housing part wherein:
      the second housing part is fixed to the first housing part;
      the second housing part and the sensor board form at least a portion of a second chamber; and
      the control board is disposed in the second chamber.

8. The motor-pump system of claim 7 further comprising a second connector, wherein:
   the second connector is fixed to the control board; and
   the second connector extends through the second housing part to transmit and receive power and control signals between the motor-pump system and an external component.

9. The motor-pump system of claim 1 further comprising a hydraulic manifold fixed to the first housing part, the hydraulic manifold comprising:
- an inlet port for providing a hydraulic fluid to the hydraulic pump; and
- an outlet port for expelling the hydraulic fluid from the hydraulic pump.

10. The motor-pump system of claim 9 wherein the first housing part comprises an orifice hydraulically connected to the inlet port.

11. The motor-pump system of claim 1 further comprising:
- a center shaft fixed to the inner gerotor; and
- a first bearing, wherein the inner gerotor is rotationally supported on the first housing part by the first bearing.

12. The motor-pump system of claim 11 further comprising:
- a center plate fixed to the sensor board; and
- a second bearing, wherein the inner gerotor is rotationally supported on the center plate by the second bearing.

13. The motor-pump system of claim 1 wherein the control board comprises a processor configured to:
- receive the signal from the sensor board; and
- receive a first three-phase current signal from the stator assembly.

14. The motor-pump system of claim 13 wherein the processor is further configured to receive a pressure signal from a pressure sensor or a flow signal from a flow sensor.

15. The motor-pump system of claim 13 wherein the processor is further configured to transmit a second three-phase current signal to the stator assembly.

16. A motor-pump system, comprising:
a first housing part;
a hydraulic pump comprising:
- an outer gerotor rotationally supported on the first housing part; and
- an inner gerotor rotationally supported on the first housing part;

an electric motor comprising:
- a stator assembly rotationally fixed in the first housing part; and
- a rotor assembly fixed to the outer gerotor;

a sensor board comprising a plurality of sensor traces configured for inductively sensing a signal from the rotor assembly when the outer gerotor is rotated;
a center shaft fixed to the inner gerotor; and
a first bearing, wherein the inner gerotor is rotationally supported on the first housing part by the first bearing.

17. A motor-pump system, comprising:
a first housing part;
a hydraulic pump comprising:
- an outer gerotor rotationally supported on the first housing part; and
- an inner gerotor rotationally supported on the first housing part;

an electric motor comprising:
- a stator assembly rotationally fixed in the first housing part; and
- a rotor assembly fixed to the outer gerotor;

a sensor board comprising a plurality of sensor traces configured for inductively sensing a signal from the rotor assembly when the outer gerotor is rotated;
a control board electrically connected to the stator assembly and the sensor board, the control board comprising a processor configured to:
- receive the signal from the sensor board;
- receive a first three-phase current signal from the stator assembly; and
- transmit a second three-phase current signal to the stator assembly.

* * * * *